United States Patent [19]
Yamamoto et al.

[11] Patent Number: 5,609,432
[45] Date of Patent: Mar. 11, 1997

[54] BALLPOINT PEN CONTAINING AN AQUEOUS INK COMPOSITION

[75] Inventors: Takeyuki Yamamoto; Yasuyuki Sugimoto, both of Hiratsuka; Itaru Wakagi, Kanagawa; Shinichi Murakata, Kanagawa; Yasuzo Murata, Kanagawa, all of Japan

[73] Assignee: Kabushiki Kaisha Pilot, Tokyo, Japan

[21] Appl. No.: 446,072

[22] Filed: May 19, 1995

[30] Foreign Application Priority Data

Dec. 16, 1994 [JP] Japan .................................. 6-338276

[51] Int. Cl.$^6$ .............................. B43K 7/00; B43K 7/08; B43K 7/10
[52] U.S. Cl. ............................................ 401/209; 401/216
[58] Field of Search ...................................... 401/209, 216

[56] References Cited

U.S. PATENT DOCUMENTS 4,471,079  9/1984  Enami .................................. 401/209 X

FOREIGN PATENT DOCUMENTS 60-49072  3/1985  Japan ..................................... 401/209
6239086  8/1994  Japan ..................................... 401/209

*Primary Examiner*—Steven A. Bratlie
*Attorney, Agent, or Firm*—Foley & Lardner

[57] ABSTRACT

A ballpoint pen contains an aqueous ink composition into which ink is directly filled. The pen is free from ink dripping and has improved writing performance. The aqueous ink composition is directly filled into an ink reservoir tube equipped with a ballpoint pen tip. The aqueous ink composition includes (a) an aqueous medium, (b) a pigment and (c) a carboxyl group-containing crosslinked hydrophilic polymer. The hydrophilic polymer swells and disperses in a gel state in the form of particles having a particle diameter of 0.5 to 10 μm. The polymer is crosslinked with a crosslinkable monomer having at least two polymerizable unsaturated groups in an amount of 0.5 mol % or more based on the total of a carboxyl group-containing monomer and a copolymerizable monoethylenic monomer used together, if desired. The ink reservoir tube tip has a clearance between a ball and a ball receiver in the range of 10 to 40 μm.

10 Claims, 1 Drawing Sheet

BALLPOINT PEN CONTAINING AN AQUEOUS INK COMPOSITION

BACKGROUND OF THE INVENTION

The present invention relates to a ballpoint pen containing an aqueous ink composition. More specifically, it relates to a ballpoint pen containing an aqueous ink composition in which ink is directly filled into an ink reservoir tube to directly feed the ink to a ballpoint pen tip without using an ink absorber, an ink feed rod and an ink feed controller.

Ballpoint pens containing an aqueous ink composition can be generally classified into three different types. In a first type, a ballpoint pen includes ink which is absorbed by an ink absorber arranged in an ink reservoir tube. The ink is fed to a ballpoint pen top via an ink feed rod arranged between the ink reservoir and the ballpoint pen tip. In a second type, a ballpoint pen is directly filled with ink into the ink reservoir tube. The ink is fed to the ballpoint pen tip via an ink feed controller and an ink feed rod arranged between the ink reservoir tube and the ballpoint pen tip. In the third type, a ballpoint pen is directly filled with ink into the ink reservoir tube, and the ink is directly fed to the ballpoint pen tip without using the ink absorber, the ink feed rod and the ink feed controller.

The above-mentioned third type ballpoint pen has an advantage that a large amount of ink is reserved and all the ink can be used. However, in view of the structure of this ballpoint pen, it is necessary that when the ballpoint pen is left as it is, i.e., when it is not used, the ink must be in a highly viscous state so as to prevent ink leakage through the ballpoint pen tip. When the ballpoint pen is used, the ball of the ballpoint pen is rotated to give shearing force to the ink, so that the viscosity of the ink lowers, and so that the ink is allowed to flow through the ballpoint pen tip. In addition, there are also more severe performance requirements, such that dripping of ink must be prevented while the ballpoint pen tip is allowed to stand in a downward direction, even under extreme condition such as temperature and humidity change. Moreover, it is also required that the ink feed remain good without any starving and splitting of the ink on the written lines. Furthermore, the contrast of the written lines must be high and the written lines must be sharp for a long period of time.

In order to meet the above-mentioned requirements, various suggestions have been heretofore made, but any concept which can sufficiently meet these requirements has not been obtained so far.

For example, an ink for writing implements has been suggested in which a crosslinked acrylic acid resin is used to impart thixotropy to the ink (Japanese Laid-Open Patent Application No. 57-49678/1982). However, this ink has the drawback as in the case of the third type of ballpoint pen mentioned above, in that the ink cannot be prevented from dripping from the ballpoint pen tip when the ballpoint pen tip is allowed to stand downward.

SUMMARY OF THE INVENTION

An object of the present invention is to provide a direct filling type ballpoint pen which can meet the above-mentioned requirements, particularly a ballpoint pen having improved ink dripping prevention performance.

The present invention relates to an ink which includes a specific crosslinked hydrophilic polymer which swells in the ink and disperses in a gel state. The particle diameter of the swelled gel particles is in a specific range. This feature is combined with a ballpoint pen tip in which the clearance between the ball and the ball receiver is in a specific range. The above-mentioned objects can be achieved by the synergistic effect of the combination in accordance with the invention.

Thus, the present invention is directed to the following aspects:

The ballpoint pen of this invention contains an aqueous ink composition, wherein an ink reservoir tube of the pen can be directly filled with ink. The aqueous ink composition includes: (a) an aqueous medium, (b) a pigment and (c) a carboxyl group-containing crosslinked hydrophilic polymer which swells and disperses in a gel state in the form of particles having a particle diameter of 0.5 to 10 μm. The hydrophilic polymer can be crosslinked with a crosslinkable monomer having at least two polymerizable unsaturated groups in an amount of 0.5 mol % or more based on the total of the carboxyl group-containing monomer and a copolymerizable monoethylenic monomer used together, if desired. This ink can be directly filled into the ink reservoir tube equipped with a ballpoint pen tip, wherein the clearance between the ball and the ball receiver of the pen tip is in the range of 10 to 40 μm.

In one embodiment of the ballpoint pen containing an aqueous ink composition according to present invention, the ink includes 5 to 90% by weight of water, 0 to 50% by weight of a humectant, 1 to 50% by weight of the pigment and 0.1 to 2% by weight of the carboxyl group-containing crosslinked hydrophilic polymer. Preferably, the amount of water to be blended is in the range of 25 to 85% by weight.

The carboxyl group-containing crosslinked hydrophilic copolymer according to one embodiment of the invention can be a polymer of a carboxyl group-containing monoethylenic monomer and a crosslinkable monomer.

According to another embodiment of the invention, the carboxyl group-containing crosslinked hydrophilic polymer can be a copolymer of a carboxyl group-containing monomer, a monoethylenic monomer copolymerizable with this monomer and a crosslinkable monomer.

In further another embodiment of the invention, the carboxyl group-containing crosslinked hydrophilic polymer can be a copolymer crosslinked with one or more crosslinkable monomers selected from the group consisting of a polyalkylene glycol bisallyl ether having at least two unsaturated groups, an allylsucrose and a polyfunctional acrylic monomer. A corrosion-resistant lubricant, a pH adjustor, or an antibacterial agent can be added to the ink. Further, a plug mainly comprising grease to prevent ink leakage through back of an ink reservoir tube can be inserted into another side opposite to the side of the ink reservoir tube from the ballpoint pen tip.

PREFERRED EMBODIMENTS OF THE INVENTION

Figure 1:
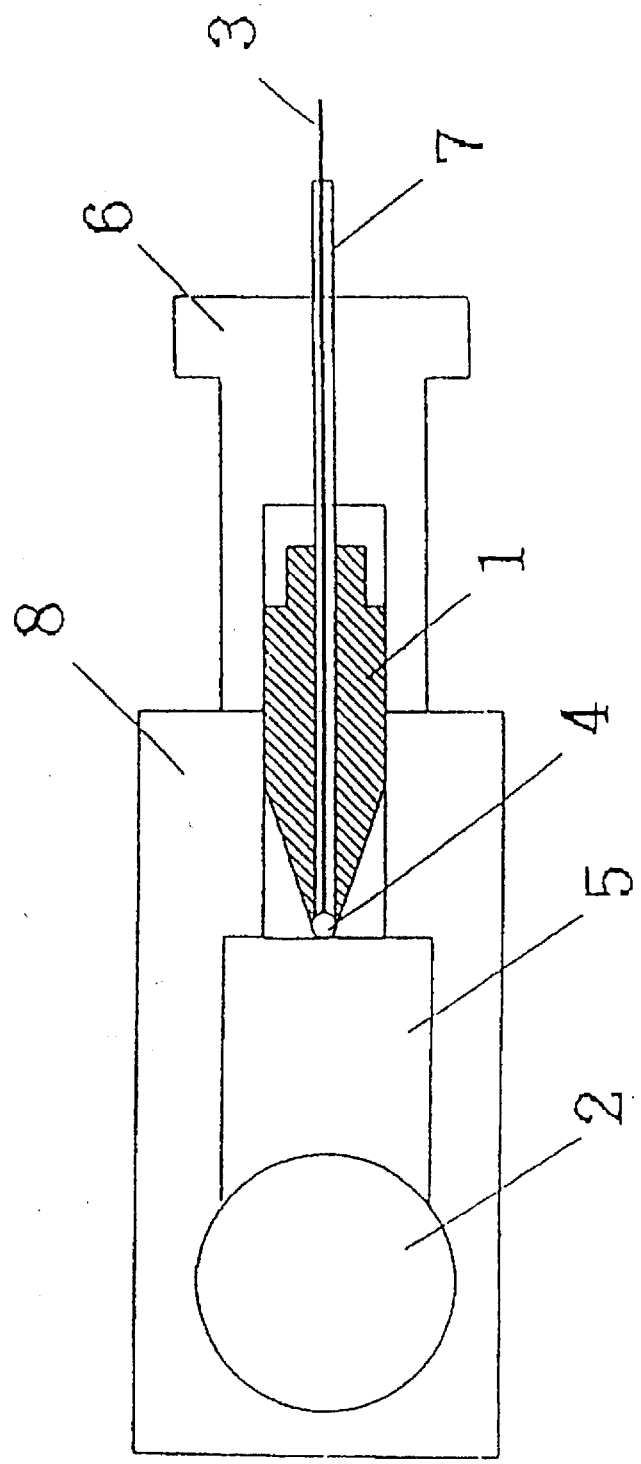
FIG. 1 is an illustrative view illustrating a measurement procedure of a clearance of a ballpoint pen tip.

The first feature of the present invention resides in the use of a carboxyl group-containing crosslinked hydrophilic polymer which swells and disperses in a gel state in the form of particles having a particle diameter of, e.g., 0.5 to 10 μm and which can be crosslinked with a crosslinkable monomer having at least two polymerizable unsaturated groups in an amount of, e.g., 0.5 mol % or more based on the total of carboxyl group-containing monomer. Amounts of crosslinkable monomer of 0.5 mlo % to 1.2 mol % are particularly good for purposes of the invention. This can be used together with a copolymerizable monoethylenic monomer if desired.

The above-mentioned crosslinked hydrophilic polymer can be a polymer in which the monomer having a carboxyl group are crosslinked with the crosslinkable monomer to form a three-dimensional network structure.

Examples of the monomer for forming the above-mentioned crosslinked hydrophilic polymer may include carboxyl group-containing monomers such as acrylic acid, methacrylic acid, itaconic acid, maleic anhydride and fumaric acid, and they can be used singly or in a combination of two or more thereof. Furthermore, acrylamide or vinylpyrrolidone can also be used together as a hydrophilic monomer.

Examples of the crosslinkable monomer can include an alkenyl ether having at least two unsaturated groups such as diethylene glycol bisallyl ether and polyalkylene glycol bisallyl ether, allylsucrose and polyfunctional acrylic monomers such as trimethylolpropane triacrylate.

In the case where the carboxyl group-containing monomer is used or this monomer and the copolymerizable monomer are used together, the crosslinkable monomer is preferably used in an amount of 0.5 mol % or more based on the total monomers to suitably form the crosslinked hydrophilic polymer having the good three-dimensional network structure which swells and disperses in a gel state in the ink. If the amount of the crosslinkable monomer is less than 0.5 mol %, the three-dimensional network structure is weak, so that the swelled gel dispersion particles are not formed and the polymer is dissolved in the ink, with the result that the ink tends to drip from the ballpoint pen tip.

Examples of the blend of the carboxyl group-containing monomer and the crosslinkable monomer are as follows:

(1) 11.8 parts by weight (0.164 mol part) of an acrylic monomer and 0.3 part by weight (0.0016 mol part) of diethylene glycol bisallyl ether which is the crosslinkable monomer, and in this case, the content of the crosslinkable monomer is 1 mol %;

(2) 100 parts by weight (1.16 mol parts) of a methacrylic monomer and 2.5 parts by weight (0.012 mol part) of diethylene glycol bismethacryl ether, and in this case, the content of the crosslinkable monomer is about 1 mol %; and (3) 10 parts by weight (0.139 mol part) of the acrylic monomer, 2 parts by weight (0.020 mol part) of maleic anhydride and 0.6 part by weight (0.00185 mol part) of polyethylene glycol bismethacryl ether, and in this case, the content of the crosslinkable monomer is about 1.2 mol %.

The copolymer of the carboxyl group-consisting monomer and the crosslinkable monomer can usually be obtained in the state of a white fine powder by carrying out polymerization in a solution in which the copolymer is not dissolved. This powder forms the crosslinked hydrophilic polymer which swells and disperses in a gel state in the ink.

The crosslinked hydrophilic polymer for use in the present invention which swells and disperses in the gel state in the ink can exert excellent effects of improving the stability of the ink with time and bringing the ink into a suitable plastic flow liquid.

Examples of the aqueous medium which can be used in the present invention include water and a mixture of water and a humectant. The humectant is blended for the purpose of preventing the vaporization of water from the ink, and examples of the humectant include water-miscible compounds such as ethylene glycol, propylene glycol, glycerin, diethylene glycol, triethylene glycol, dipropylene glycol, thiodiglycol, polyglycerin, polyethylene glycol, polypropylene glycol, methyl cellosolve, butyl cellosolve, methyl carbitol and ethyl carbitol. These humectants may be used singly or in a combination of two or more thereof. The blend of the aqueous medium can be 5 to 90% by weight of water and 0 to 50% by weight of the humectant, preferably 25 to 90% by weight of water and 0 to 50% by weight of the humectant, more preferably 30 to 85% by weight of water and 0 to 50% by weight of the humectant.

In the present invention, a pigment can be used as a colorant. The pigment can heighten the contrast of written lines, is excellent in water resistance and light resistance, and can keep the sharpness of the written lines for a long period of time, as compared with a dye. No particular restriction is put on the kind of pigment to be used, and examples of the pigment include organic pigments, inorganic pigments and fluorescent pigments, and they may be used singly or in a combination of two or more thereof. The amount of the pigment to be blended is preferably in the range of 1 to 50% by weight With regard to the amount of the pigment to be blended, the content of the inorganic pigment and the organic pigment can be in the range of 1 to 50% by weight, preferably 1 to 30% by weight, and the content of the fluorescent pigment can be in the range of 1 of 50% by weight, preferably 5 to 50% by weight.

The carboxyl group-containing polymer can be preferably used in an amount of 0.1 to 2% by weight If the number of the swelled gel dispersion particles in the ink is small, a particulate interaction which functions between the swelled gel dispersion particles and the pigment may not be sufficient, so that the effect of preventing the ink from dripping from the ballpoint pen tip may be poor.

On the other hand, if the number of the swelled gel dispersion particles in the ink is excessively larger than required, the particulate interaction which functions between the swelled gel dispersion particles and the pigment can be too strong The result in the interaction cannot be broken sufficiently with only the shearing force obtained by the rotation of the ball at the time of writing, and hence smooth flow of the ink is impeded.

Hence, in the present invention, the amount of the crosslinked hydrophilic polymer for forming the swelled gel dispersion particles in the ink is preferably in the range of 0.1 to 2% by weight The pigment has the added advantage that the ink can be easily prepared by the use of an aqueous pigment dispersion Examples of the usable corrosion-resistant lubricant include phosphate-including surface active agents, benzotriazoles and fatty acid esters. The ballpoint pen tip of the ballpoint pen containing an aqueous ink composition comprises a metallic ball and a ball receiver, and since the ink is aqueous, rust tends to form on the ball to worsen the rotation of the ball. The blended corrosion-resistant lubricant has the effect of not only preventing the occurrence of the rust but also smoothing the rotation of the ball. The amount of the corrosion-resistant lubricant to be blended is preferably in the range of 0.2 to 2% by weight.

In addition, a pH adjustor can be blended in an amount of 0.1 to 6% by weight, and examples of the pH adjustor include monoethanolamine, diethanolamine, triethanolamine, N,N-dimethylethanolamine, N,N-diethylethanolamine, N,N-dibutylethanolamine and N-methyldiethanolamine.

In swelling and dispersing the crosslinked hydrophilic polymer in the gel state in the ink, the neutralization of the carboxyl group can accelerate the swelling. Therefore, it is effective to blend the pH adjustor, and in examples which will be described, various kinds of amines can be added as the pH adjustors.

In this connection, when a salt obtained by prior neutralizing the carboxyl groups of the crosslinked hydrophilic polymer with sodium or the like is used, the pH adjustor is not always necessary.

If necessary, an antibacterial agent can be blended to improve storage properties, and examples of the antibacterial agent include 1,2-benzisothiazoline-3-one, sodium benzoate and sodium dehydroacetate.

The second feature of the present invention resides in that the clearance between the ball and the ball receiver which constitutes the ballpoint pen tip can be in the range of 10 to 40 μm, and this ballpoint pen tip can be combined with the above-mentioned ink.

According to the results of experiments, if the particle diameter of the swelled gel dispersion particles is less than 0.5 μm, these particles are nearly dissolved, so that the ink dripping cannot be prevented as desired. If that is more than about 10 μm, the ink can be difficult to flow through an ink passage, so that the flow of the ink can deteriorate. In addition, if the clearance of the ballpoint pen tip is less than about 10 μm, the flow of the ink can deteriorate, though the ink dripping can satisfactorily be prevented. If it is more than about 40 μm, ink dripping can occur, and particularly in an atmosphere where relative humidity is in excess of 90%, dripping of the ink can be noticeable.

Therefore, it is desirable that in practice the diameter of the swelled gel dispersion particles in the ink is in the range of 0.5 to 10 μm, and the clearance between the ball and the ball receiver which constitute the ballpoint pen tip is in the range of 10 to 40 μm. If either or both of these requirements is not met, the ink dripping can occur and the flow of the ink can deteriorate, so that the ballpoint pen having a good writing performance cannot satisfactorily be obtained.

Theoretical grounds of such effects cannot always definitely be explained, but the present inventors can presume that if the particle diameter of the swelled gel dispersion particles and the clearance of the ballpoint pen tip are within the proper ranges, when the ballpoint pen containing an aqueous ink composition is not used, the clearance of the ballpoint pen tip can be closed with the swelled gel dispersion particles and the pigment by a interaction between the particles to prevent the ink dripping from the ballpoint pen tip. On the other hand, when shearing force is applied to the ink at the time of writing, i.e., at the rotation of the ball, the above-mentioned interaction can be broken, so that the ink can smoothly flow through the clearance of the ballpoint pen tip.

In the present invention, the aqueous medium, the pigment, the crosslinked hydrophilic polymer, if necessary, the pH adjustor, the surface active agent and the antibacterial agent can be mixed and dispersed to prepare the ink, but the regulation of the particle diameter of the swelled gel dispersion particles can be carried out by shearing stirring at the time of the dispersion. The dispersion can be performed by the use of a certain kind of stirrer or disperser. However, in the case of a low shearing stirring operation of 1,000 r.p.m. or less (a homodisperser), the swelled gel which is outside the above-mentioned range of the particle diameter can be formed, and in the case of a shearing stirring operation of 3,000 r.p.m. or more, the swelled gel which is within the above-mentioned range of the particle diameter can be obtained. The particle diameter of the particles can be confirmed through the usual optical microscope.

The clearance between the ball and the ball receiver can be measured, as shown in FIG. 1, by pushing a ball 4 with a needle 3 inserted into a ballpoint pen tip 1 from its rear side, while the top of the ballpoint pen tip 1 is brought into contact with a digital indicator 2, to move a shaft 5 of the digital indicator 2. In the drawing, reference numeral 6 is a jig, numeral 7 is a needle guide, and 8 is a guide for the digital indicator shaft.

The ballpoint pen tips can be classified into a traditional cone shaped type ballpoint pen tip comprising a metallic ball and a receiver for receiving the ball and a pipe type ballpoint pen tip in which the ball is held on a ball seat formed by working the top of a metallic pipe. In compliance with a desired thickness of written lines, the ball having a diameter of about 0.3 to 1.6 mm can be used.

EXAMPLES

The following examples serve to illustrate the present invention.

(1) Preparation of blend solution

Blend solution A
The following materials were blended to form a blend solution A:

| | |
|---|---|
| Glycerin (a humectant) | 30 parts by weight (pts. wt.) |
| Triethanolamine (a pH adjustor) | 1.8 pts. wt. |
| Polyoxyethylene alkyl ether phosphate (a surface active agent) | 1.0 pts. wt. |
| 10% propylene glycol solution of 1,2-benzisothiazoline-3-one (an antibacterial agent) | 0.2 pts. wt |
| Ion-exchanged water | 15.0 pts. wt. |

Blend solution B
The following materials were blended to form a blend solution B:

| | |
|---|---|
| Glycerin (a humectant) | 20.0 pts. wt. |
| Triethanolamine (a pH adjustor) | 0.8 pts. wt. |
| Polyoxyethylene alkyl ether phosphate (a surface active agent) | 1.0 pts. wt. |
| 10% propylene glycol solution of 1,2-benzisothiazoline-3-one (an antibacterial agent) | 0.2 pts. wt. |
| Ion-exchanged water | 25.0 pts. wt. |

Blend solution C
The following materials were blended to form a blend solution C:

| | |
|---|---|
| Ethylene glycol (a humectant) | 30.0 pts. wt. |
| Triethanolamine (a pH adjustor) | 0.8 pts. wt. |
| Polyoxyethylene alkyl ether phosphate (a surface active agent) | 1.5 pts. wt. |
| 10% propylene glycol solution 1,2-benzisothiazoline-3-one (an antibacterial agent) | 0.2 pts. wt. |
| Ion-exchanged water | 17.1 pts. wt. |

Blend solution D
The following materials were blended to form a blend solution D:

| | |
|---|---|
| Ethylene glycol (a humectant) | 10.0 pts. wt. |
| Glycerin (a humectant) | 10.0 pts. wt. |
| Triethanolamine (a pH adjustor) | 0.8 pts. wt. |
| Polyoxyethylene alkyl ether phosphate (a surface active agent) | 1.5 pts. wt. |
| 10% propylene glycol solution of 1,2-benzisothiazoline-3-one (an antibacterial agent) | 0.2 pts. wt. |
| Ion-exchanged water | 27.1 pts. wt. |

Blend solution E

-continued

The following materials were blended to form a blend solution E:

| | |
|---|---|
| Glycerin (a humectant) | 20.0 pts. wt. |
| N,N-diethylamine ethanolamine (a pH adjustor) | 0.8 pts. wt. |
| Polyoxyethylene alkyl ether phosphate (a surface active agent) | 1.5 pts. wt. |
| 10% propylene glycol solution of 1,2-benzisothiazoline-3-one (an antibacterial agent) | 0.2 pts. wt. |
| Ion-exchanged water | 27.1 pts. wt. |

(2) Ink Blend Examples

Blend Example 1

To 47.0 parts by weight of the blend solution B were added 50.0 parts by weight of Chichicaca Color Red F-14 (Mikuni Color Works Co., Ltd., an aqueous pigment dispersion, solid content =16%), 2.6 parts by weight of ion-exchanged water and 0.4 parts by weight of a crosslinked acrylic resin which was crosslinked with a crosslinkable monomer in an amount of 1.2 mol % based on a carboxyl group-containing monomer, and stirring and dispersion were then carried out at 50 to 60° C. for 20 minutes at 3,000 r.p.m. by a homodisperser to obtain a red ink.

The crosslinked acrylic resin in the ink was present in the state of a swelled gel dispersion, and according to microscopic inspection, its particle diameter was in the range of 1 to 2 μm.

Blend Example 2

To 48.0 parts by weight of the blend solution B were added 50.0 parts by weight of Victoria Color Pink G-23 (Mikuni Color Works Co., Ltd., an aqueous pigment dispersion, solid content =40%), 1.6 parts by weight of ion-exchanged water and 0.4 parts by weight of a crosslinked acrylic resin which was crosslinked with a crosslinkable monomer in an amount of 0.8 mol % based on a carboxyl group-containing monomer, and the same procedure as in Blend Example 1 was then carried out to obtain an ink of fluorescent pink.

The crosslinked acrylic resin in the ink was present in the state of a swelled gel dispersion, and according to microscopic inspection, its particle diameter was in the range of 1 to 2 μm.

Blend Example 3

To 47.0 parts by weight of the blend solution B were added 50.0 parts by weight of Chichicaca Color Black F-10 (Mikuni Color Works Co., Ltd., an aqueous pigment dispersion, solid content =19%), 2.6 parts by weight of ion-exchanged water and 0.4 parts by weight of a crosslinked acrylic resin which was crosslinked with a crosslinkable monomer in an amount of 0.8 mol % based on a carboxyl group-containing monomer, followed by stirring to sufficiently wet the crosslinked acrylic resin. Afterward, a dispersing operation was carried out for 50 minutes by the use of a dinomill (diameter of zircon beads =0.5 to 0.8 mm) to obtain a black ink.

The crosslinked acrylic resin in the ink was present in the state of a swelled gel dispersion, and according to microscopic inspection, its particle diameter was in the range of 0.5 to 1 μm.

Blend Example 4

To 48.0 parts by weight of the blend solution A were added 50.0 parts by weight of Victoria Color Yellow G-20 (Mikuni Color Works Co., Ltd., an aqueous pigment dispersion, solid content =40%), 1.7 parts by weight of ion-exchanged water and 0.3 parts by weight of a crosslinked acrylic resin which was crosslinked with a crosslinkable monomer in an amount of 0.4 mol % based on a carboxyl group-containing monomer, and the same procedure as in Blend Example 1 was then carried out to obtain an ink of fluorescent yellow.

According to the microscopic inspection, the crosslinked acrylic resin in the ink was dissolved.

Blend Example 5

To 48.0 parts by weight of the blend solution A were added 50.0 parts by weight of Victoria Color Green G-24C (Mikuni Color Works Co., Ltd., an aqueous pigment dispersion, solid content =40%), 0.6 parts by weight of ion-exchanged water and 1.4 parts by weight of an acrylate copolymer emulsion having a solid content of 30% by weight which was not crosslinked with a crosslinkable monomer, followed by stirring for 5 minutes to obtain an ink of fluorescent green.

According to microscopic inspection, the acrylate copolymer in the ink was dissolved.

Blend Example 6

To 49.6 parts by weight of the blend solution C were added 50.0 parts by weight of Chichicala Color Black F-10 (which was defined above) and 0.4 parts by weight of a crosslinked acrylic resin which was crosslinked with a crosslinkable monomer in an amount of 0.8 mol % based on a carboxyl group-containing monomer, and the same procedure as in Blend Example 1 was then carried out to obtain a black ink.

The crosslinked acrylic resin in the ink was present in the state of a swelled gel dispersion, and according to microscopic inspection, its particle diameter was in the range of 1 to 2 μm.

Blend Example 7

To 49.6 parts by weight of the blend solution D were added 50.0 parts by weight of Chichicala Color red F-14 (Mikuni Color Works Co., Ltd., an aqueous pigment dispersion, solid content =16%) and 0.4 parts by weight of a crosslinked acrylic resin which was crosslinked with a crosslinkable monomer in an amount of 1.2 mol % based on a carboxyl group-containing monomer, and the same procedure as in Blend Example 1 was then carried out to obtain a red ink.

The crosslinked acrylic resin in the ink was present in the state of a swelled gel dispersion, and according to microscopic inspection, its particle diameter was in the range of 1 to 2 μm.

Blend Example 8

To 49.6 parts by weight of the blend solution E were added 50.0 parts by weight of Chichicala Color Blue F-21 (Mikuni Color Works Co., Ltd., an aqueous pigment dispersion, solid content =25%) and 0.4 parts by weight of a crosslinked acrylic resin which was crosslinked with a crosslinkable monomer in an amount of 0.8 mol % based on a carboxyl group-containing monomer, and the same procedure as in Blend Example 1 was then carried out to obtain a blue ink.

The crosslinked acrylic resin in the ink was present in the state of a swelled gel dispersion, and according to microscopic inspection, its particle diameter was in the range of 1 to 2 μm.

(3) Ballpoint Pen Tip Examples

Traditional cone shape ballpoint pen tips were formed in which each ball made of a hard metal was held on a ball seat of a ball receiver made of a stainless steel, and a clearance between the ball and the ball receiver (corresponding to a movable quantity of the forward/backward movable ball of the ballpoint pen tip) was the measured in the same measuring manner as described above. The ballpoint pen tips were classified into the following groups on the basis of the measured values:

Group A . . . A ball diameter was 0.7 mm, and the clearance was in the range of 7 to 8 μm.

Group B1. . . The ball diameter was 0.5 mm, and the clearance was in the range of 15 to 25 μm.

Group B2. . . The ball diameter was 0.7 mm, and the clearance was in the range of 15 to 25 μm.

Group C . . . The ball diameter was 0.5 mm, and the clearance was in the range of 25 to 35 μm.

Group D . . . The ball diameter was 0.5 mm, and the clearance was in excess of 40 μm.

Next, preparation examples of the ballpoint pens from the above-mentioned blend examples and the ballpoint pen tip examples will be described.

For the thus prepared ballpoint pens containing an aqueous ink composition, a writing performance and an ink dripping prevention performance were evaluated. The writing performance was ranked by classifying it into a state "o" in which any line starving was not present and a state "x" in which the line starving was present on the basis of the visual evaluation. The evaluation of the ink dripping prevention performance was made as follows: Each ballpoint pen was allowed to stand at 20° C. at a relative humidity of 90% for 2 hours, downward vertically orienting the ballpoint pen tip, and an ink leakage condition through the ballpoint pen tip was visually observed. The ballpoint pen tips were then classified into a state "o" in which any ink dripping was not present and a state "x" in which the ink dripping was present. The results are together shown in Table 1.

|  | Ink | | Ballpoint Pen Tip | | Performance | |
|---|---|---|---|---|---|---|
|  | | Particle | Ball | | | |
|  | Blend Example | Diameter (μm) | Diameter (mm) | Clearance | Writing Performance | Dripping |
| Example 1 | 1 | 1–2 | 0.5 | Group B1 | o | o |
| Example 2 | 2 | 1–2 | 0.7 | Group B2 | o | o |
| Example 3 | 3 | 0.5–1 | 0.5 | Group B1 | o | o |
| Example 4 | 6 | 1–2 | 0.5 | Group B1 | o | o |
| Example 5 | 7 | 1–2 | 0.7 | Group B2 | o | o |
| Example 6 | 8 | 1–2 | 0.5 | Group C | o | o |
| Comp. Ex. 1 | 1 | 1–2 | 0.7 | Group A | x | o |
| Comp. Ex. 2 | 1 | 1–2 | 0.5 | Group D | o | x |
| Comp. Ex. 3 | 2 | 1–2 | 0.7 | Group A | x | o |
| Comp. Ex. 4 | 2 | 1–2 | 0.5 | Group D | o | x |
| Comp. Ex. 5 | 3 | 0.5–1 | 0.7 | Group A | x | o |
| Comp. Ex. 6 | 3 | 0.5–1 | 0.5 | Group D | o | x |
| Comp. Ex. 7 | 4 | Dissolved | 0.5 | Group B1 | o | x |
| Comp. Ex. 8 | 5 | Dissolved | 0.5 | Group B1 | o | x |
| Comp. Ex. 9 | 6 | 1–2 | 0.7 | Group A | x | o |
| Comp. Ex. 10 | 7 | 1–2 | 0.5 | Group D | o | x |
| Comp. Ex. 11 | 8 | 1–2 | 0.7 | Group A | x | o |

EXAMPLE 1

Five ballpoint pen tips selected from the group B1 of the ballpoint pen chip examples were mounted on ink reservoir tubes having an inner diameter of 4 mm, respectively, and 1.2 g of an ink of Blend Example 1 was filled into each of the ink reservoir tubes. Afterward, a back leakage preventing plug mainly comprising grease was inserted into the rear portion of each ink reservoir tube to prepare five aqueous ballpoint pens.

Examples 2 to 6

Inks of Blend Examples 2, 3 and 6 to 8 were filled into ballpoint pen tips selected from the groups B1, B2 and C of the ballpoint pen tip examples (the five tips from each group) in the same manner as in Example 1 to prepare ballpoint pens of Examples 2 to 6 shown in Table 1.

Comparative Examples 1 to 11

Inks of Blend Examples 1 to 8 were filled into ballpoint pen tips selected from the groups A, B1 and D of the ballpoint pen tip examples (the five tips from each group) in the same manner as in Example 1 to prepare ballpoint pen containing an aqueous ink composition of Comparative Examples 1 to 11 shown in Table 1.

As is apparent from the above-mentioned Table 1, in the ballpoint pens of the present invention, using swelled gel dispersion particles of a crosslinked hydrophilic polymer having a particle diameter in the range of 0.5 to 10 μm, and having a clearance between a ball and a ball receiver constituting a ballpoint pen tip in the range of 10 to 40 μm, showed excellent ink dripping prevention and writing performance. With regard to the ballpoint pens containing an aqueous ink composition of the present invention, the flow of an ink is good, and neither line starving nor line splitting are present as shown in Table 1. Furthermore, the contrast of written lines is high, and the written lines can remain sharp for a long period of time.

What is claim is:

1. A ballpoint pen containing an aqueous ink composition obtained by directly filling (A) an aqueous ink comprising (a) an aqueous medium, (b) a pigment and (c) a carboxyl group-containing crosslinked hydrophilic polymer which swells and disperses in a gel state in the form of particles having a particle diameter of 0.5 to 10 μm and which is crosslinked with a crosslinkable monomer having at least two polymerizable unsaturated groups in an amount of 0.5 mol % or more based on the total of a carboxyl group-containing monomer and a copolymerizable monoethylenic monomer used together if desired, into (B) an ink reservoir tube equipped with a ballpoint pen tip in which a clearance between a ball and a ball receiver is in the range of 10 to 40 μm.

2. The ballpoint pen containing an aqueous ink composition according to claim 1 wherein the ink comprising 5 to 90% by weight of water, 0 to 50% by weight of a humectant, 1 to 50% by weight of the pigment and 0.1 to 2% by weight of the carboxyl group-containing crosslinked hydrophilic polymer is used.

3. The ballpoint pen containing an aqueous ink composition according to claim 1 wherein the amount of water to be blended is in the range of 25 to 85% by weight.

4. The ballpoint pen containing an aqueous ink composition according to claim 1 wherein the carboxyl group-containing crosslinked hydrophilic polymer is a polymer of a carboxyl group-containing monoethylenic monomer and the crosslinkable monomer.

5. The ballpoint pen containing an aqueous ink composition according to claim 1 wherein the carboxyl group-containing crosslinked hydrophilic polymer is a polymer of a carboxyl group-containing monomer, a monoethylenic monomer copolymerizable with this monomer and the crosslinkable monomer.

6. The ballpoint pen containing an aqueous ink composition according to claim 1 wherein the carboxyl group-containing crosslinked hydrophilic polymer is a polymer crosslinked with one or more crosslinkable monomers selected from the group consisting of a polyalkylene glycol bisallyl ether having at least two unsaturated groups, an allylsucrose and a polyfunctional acrylic monomer.

7. The ballpoint pen containing an aqueous ink composition according to claim 1 wherein a corrosion-resistant lubricant is added to the ink.

8. The ballpoint pen containing an aqueous ink composition according to claim 1 wherein a pH adjustor is added to the ink.

9. The ballpoint pen containing an aqueous ink composition according to claims 1 wherein an antibacterial agent is added to the ink.

10. The ballpoint pen containing an aqueous ink composition according to claim 1 wherein a plug mainly comprising grease to prevent ink leakage through back of an ink reservoir tube is inserted into another side opposite to the side of the ink reservoir tube where the ballpoint pen tip is equipped.

* * * * *